United States Patent [19]
Danagher et al.

[11] Patent Number: 6,101,012
[45] Date of Patent: Aug. 8, 2000

[54] OPTICAL ADD/DROP MULTIPLEXER/ DEMULTIPLEXER

[75] Inventors: David John Danagher, Nepean; Alan G. Solheim, Kanata; Maurice S. O'Sullivan; Richard A. Habel, both of Ottawa, all of Canada; Kim Byron Roberts, Welwyn Garden City, United Kingdom; Duncan John Forbes, Bishops Stortford, United Kingdom; Nigel Baker, Harlow, United Kingdom; Ian Hardcastle, Harlow, United Kingdom; Takis Hadjifotiou, Harlow, United Kingdom; Bipin Patel, Harlow, United Kingdom; Giuseppe Bordogna, Nepean; James St. Leger Harley, Ottawa, both of Canada

[73] Assignee: Nortel Networks Corporation, Montreal, Canada

[21] Appl. No.: 09/343,414

[22] Filed: Jun. 30, 1999

Related U.S. Application Data

[62] Division of application No. 09/081,666, May 20, 1997, Pat. No. 5,959,749.

[51] Int. Cl.[7] ........................................... H04J 14/02
[52] U.S. Cl. ................................ 359/127; 359/110
[58] Field of Search ........................ 359/110, 115, 359/124, 127, 177

[56] References Cited

U.S. PATENT DOCUMENTS

| | | | |
|---|---|---|---|
| 5,859,716 | 1/1999 | O'Sullivan et al. | 359/110 |
| 5,867,289 | 2/1999 | Gerstel et al. | 359/110 |
| 5,892,606 | 4/1999 | Fatehi et al. | 359/177 |
| 5,949,560 | 9/1999 | Roberts et al. | 359/110 |

*Primary Examiner*—Kinfe-Michael Negash

[57] ABSTRACT

An add/drop multiplexer/demultiplexer (ADM) for switching, modulating and attenuating optical signals in a fiber optic network employing wavelength division multiplexing (WDM) is disclosed. The ADM is equipped an optical multiplexer for splitting an input WDM signal into individual optical signals, leading to respective 2×2 switches. Each switch has another input originating from a plurality of "add lines", and selects one of its inputs to be dropped and the other to continue along a main signal path. The retained signals may be modulated and attenuated prior to being tapped and finally multiplexed together by a WDM multiplexer. The tapped signals are optoelectronically converted and fed back to a controller, preferably a digital signal processor running a software algorithm, which controls the switching, modulation and attenuation. This permits remote control of the ADM functions by encoding instructions for the controller into a low-frequency dither signal that is embedded within the individual optical signals. The ADM can accordingly be instructed to reroute traffic, dynamically equalize or otherwise change optical channel power levels, and add or remove dither, all in real time. A specific optical channel may be reserved for control purposes, allowing a network administrator to "log in" to the ADM to override the controller software algorithm. Optionally, the optical signals can be tapped upon entry to the ADM. A bidirectional ADM can be constructed from two unidirectional ADMs, and may share the same controller. Also, a single, general multi-input multi-output switch can be used to provide an arbitrary mapping between individual input and output optical signals.

16 Claims, 4 Drawing Sheets

OPTICAL ADD/DROP MULTIPLEXER/DEMULTIPLEXER

CROSS-REFERENCES TO RELATED APPLICATIONS

This application is a division of application Ser. No. 09/081,666, filed May 20, 1998, now U.S. Pat. No. 5,959,749.

FIELD OF THE INVENTION

This invention relates to optical transmission systems in general, and specifically to a method and apparatus for switching, modulating and attenuating optical signals in fiber optic networks employing wavelength division multiplexing.

BACKGROUND OF THE INVENTION

In a typical fiber optic transmission system or network, multiple digital information signals, or channels, are transported among optical terminals by optical fibers. In wavelength division multiplexed (WDM) optical fiber networks, channels each occupying a distinct wavelength of light share the same fiber, thereby effectively increasing the capacity of the fiber. The number of channels per fiber may exceed 32 in the case of dense WDM (DWDM) networks.

The distance between optical terminals of the optical fiber transmission system is limited by transmitter power, receiver sensitivity, and loss and dispersion considerations. Where the distance between end points of an optical fiber transmission system exceeds the maximum distance between optical terminals, amplifiers (also known as repeaters) are provided. As the data rates of optical fiber transmission systems enter the 10 Gigabits per second (Gbps) to 40 Gbps range per channel, it would be prohibitively expensive to convert a multi-wavelength optical input signal into multiple electronic signals prior to amplification and reconverting the amplified electronic signals to a WDM output signal. Therefore, it preferable to use purely optical amplifiers to perform amplification of channels, thereby circumventing the huge potential cost of electronic-to-optical and optical-to-electronic conversion.

At various points along the fiber, there will also be located optical add/drop multiplexer/demultiplexers (ADMs) for introducing (adding) supplementary optical channels coming from another part of the network to the stream of traffic between two optical terminals. The optical ADM also serves to divert (drop) optical channels from the main signal path on the fiber to another part of the network. A selectable but predetermined routing pattern is executed between pairs of input and output channels of the component, i.e., the ADM acts as a switch.

Current optical ADMs are essentially passive components and lack the capability to make decisions related to switching and power control. Consequently, there are specific problems and disadvantages associated with current WDM systems using optical ADMs, including the inability to equalize the distorted optical power spectrum of an incoming WDM signal, awkward fault isolation mechanisms, network traffic congestion and inter-manufacturer incompatibility. In particular, the relative optical gain of individual optical channels in the WDM spectrum can become distorted by the effects of gain tilt in optical amplifiers located upstream from the ADM. That is to say, the initial (and usually optimal) relative intensity of wavelengths in the power spectrum of a WDM or DWDM signal is not preserved by amplifiers that provide signals to the ADM, thereby reducing the effective maximum distance between amplifiers and causing undesirable effects such as increased bit-error rate. When gain tilt affects the power spectrum of a WDM signal, prompt action must therefore be taken to equalize or restore its optimal spectral shape.

Moreover, faults occurring upstream cause a loss of data in the ADM, but it is difficult for the component to differentiate between a nonexistent signal at its input and one that has been deliberately set to zero intensity, especially since an optical ADM has no visibility into the data due to the absence of optoelectronic conversion.

Furthermore, in the event of a fault downstream from the ADM, it will continue to send data to the faulty region until personnel is dispatched to manually "drop" the traffic, i.e., reroute the traffic towards operable regions of the network.

Similarly, knowledge of a traffic bottleneck downstream may also suggest rerouting the traffic at an ADM. Unfortunately, prior art components are not equipped with a real-time controllable add/drop capability, and hence congestion remains an unavoidable phenomenon.

Another fundamental problem that plagues modern-day fiber optic network manufacturers is the high cost of interoperability. When one manufacturer links its network with that of a peer (e.g. for use during an emergency or after acquisition of the peer company), modification of equipment in one or both of the existing networks, due to, for example, differences in control signalling, may incur exorbitant costs. No solutions to this or any of the other aforementioned problems in relation to optical ADMs has been found in prior art teachings.

SUMMARY OF THE INVENTION

It is an object of the present invention to mitigate or obviate one or more disadvantages of the prior art.

Therefore, the invention may be summarized according to a first broad aspect as an add/drop multiplexer/demultiplexer (ADM) for connection in a fiber optic network adapted to carry WDM optical signals, the ADM comprising first and second optical ports for connection to the network; a wavelength demultiplexer connected to the first port and a wavelength multiplexer connected to the second port; a plurality of optical signal lines extending between the demultiplexer and the multiplexer for carrying respective demultiplexed optical signals; a plurality of optical switches connected respectively to the plurality of optical signals lines, each switch also being connected to a respective one of a plurality of add signal lines and to a respective one of a plurality of drop signal lines; a plurality of optoelectronic converters respectively connected to the plurality of optical signal lines; a controller electronically connected to the optoelectronic converters and the optical switches for detecting dither signals in the demultiplexed optical signals and controlling the optical switches according to instructions encoded in the detected dither signals.

The invention may be summarized according to a second broad aspect as an add/drop multiplexer/demultiplexer (ADM) for connection in a fiber optic network adapted to carry wavelength division multiplexed (WDM) optical signals, the ADM comprising a wavelength demultiplexer having an input port for connection to the network and a plurality of output ports respectively connected to a plurality of optical input signal lines for carrying respective demultiplexed optical input signals; a wavelength multiplexer having an output port for connection to the network and a plurality of input ports respectively connected to a plurality of optical output signal lines for carrying respective demultiplexed optical output signals; a plurality of controllable optical switches, each having a first input connected to a respective one of the plurality of optical input signal lines, a first output connected to a respective one of the plurality of optical output signal lines, a second input connected to a respective one of a plurality of add signal lines and a second output connected to a respective one of a plurality of drop signal lines; a plurality of optoelectronic converters respectively intercepting the plurality of optical output signal lines; and a controller electronically connected to the optoelectronic converters and to the optical switches, for detecting dither signals contained in the demultiplexed optical output signals and controlling the optical switches according to instructions encoded in the detected dither signals.

According to a third broad aspect, the invention may be summarized as a method of controlling optical signals arriving at an add/drop multiplexer/demultiplexer (ADM) connected in a fiber optic network, the method comprising detecting dither signals respectively embedded in the optical signals, and controlling the optical signals according to the detected dither signals.

The invention may be summarized according to a fourth broad aspect as a method of switching optical signals arriving at an add/drop multiplexer/demultiplexer (ADM) connected in a fiber optic network, the method comprising encoding switching instructions for each optical signal as a respective dither signal; embedding the dither signals respectively within the optical signals; detecting the dither signals at the ADM; decoding the switching instructions from the dither signals; and switching the optical signals arriving at the ADM according to the decoded switching instructions.

According to a fifth broad aspect, the present invention may be summarized as an optical router for use in a fiber optic network adapted to carry wavelength division multiplexed (WDM) optical signals, the router comprising a plurality of input ports for connection to the network and for carrying respective optical input signals; a plurality of output ports for connection to the network and for carrying respective optical output signals; demultiplexing means for separating the optical input signals into respective sets of demultiplexed optical input signals; multiplexing means for forming the output WDM optical signals from respective sets of demultiplexed optical output signals; switch means for selectively interconnecting the demultiplexed optical input signals to the demultiplexed optical output signals; and control means for controlling the switch according to instructions provided by dither signals embedded within the demultiplexed optical input or output signals.

BRIEF DESCRIPTION OF THE DRAWINGS

The preferred embodiment of the present invention will now be described with reference to the attached drawings, in which.

DETAILED DESCRIPTION OF THE PREFERRED EMBODIMENT

Figure 1:
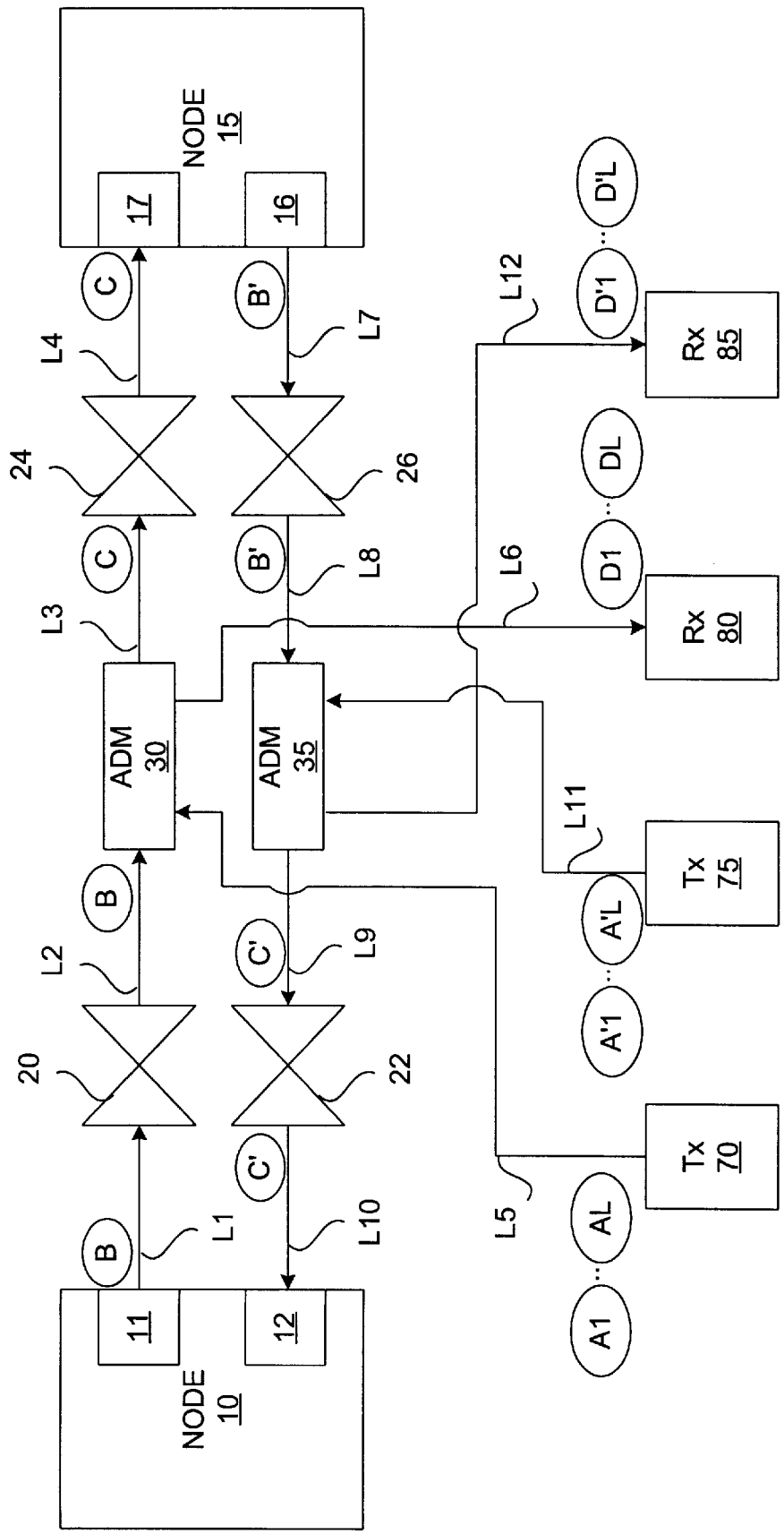
FIG. 1 is a block diagram of a fiber optic communications system including a pair of inventive unidirectional ADMs.

FIG. 1 depicts an exemplary bidirectional fiber optic communication system comprising two terminal nodes 10,15 with respective optical transmit ports 11,16 and optical receive ports 12,17. The transmit port of either node is joined to the receive port of the other node by a series of network components and fiber optic links. A first span L1 originating at the transmit port 11 of node 10 terminates at a unidirectional multi-wavelength optical repeater (MOR) 20 and carries a wavelength-division multiplexed (WDM) signal B. Another span L2 transports signal B from the MOR 20 to a unidirectional add/drop multiplexer/demultiplexer (ADM) 30.

The ADM 30 is connected to the receive port 17 of node 15 by fiber optic segments L3 and L4 carrying a WDM signal C and intercepted by another MOR 24. The ADM 30 is also joined to a plurality (L) of optical transmitters 70 by optical "add lines" L5 carrying signals A1,A2, . . . ,AL, and to a plurality (L) of optical receivers 80 by optical "drop lines" L6 transporting signals D1,D2, . . . ,DL.

Similarly, the transmit port 16 of node 15 is connected to an ADM 35 via two fiber optic segments L7 and L8 carrying a WDM signal B' and linked by an MOR 26. The ADM 35 is connected to another MOR 22 by a fiber optic link L9 carrying a WDM signal C'. The ADM 35 is also joined to a plurality (L) of optical transmitters 75 by optical add lines L11 carrying signals A'1,A'2, . . . ,A'L, and to a plurality (L) of optical receivers 85 by optical drop lines L12 transporting signals D'1,D'2, . . . ,D'L. Finally, the MOR 22 is connected to the receive port 12 of node 10 by a fiber optic link L10 transporting signal C'.

In the illustrated embodiment, there are two directions of traffic flow. In one direction, node 10 generates the WDM optical signal B which is sent from its transmit port 11 in the direction of node 15. Along the way, signal B is retransmitted and usually amplified by MOR 20 and enters ADM 30, which also accepts optical add signals A1,A2, . . . ,AL arriving from transmitters 70. As described hereunder, ADM 30 performs a switching operation and outputs signal C, headed for the receive port 17 of node 15 via MOR 24, in addition to drop signals D1,D2, . . . ,DL headed for optical receivers 80.

In the reverse direction, an analogous route is followed by WDM signal B' transmitted from the transmit port 16 of node 15, reaching ADM 35 via MOR 26. ADM 35 also accepts add signals A'1,A'2, . . . ,A'L from optical transmitters 75, and outputs WDM signal C' that passes through MOR 22 on its way to the receive port 12 of node 10. In addition, the ADM 35 outputs drop signals D'1,D'2, . . . ,D'L that are captured by respective optical receivers 85.

Figure 2:
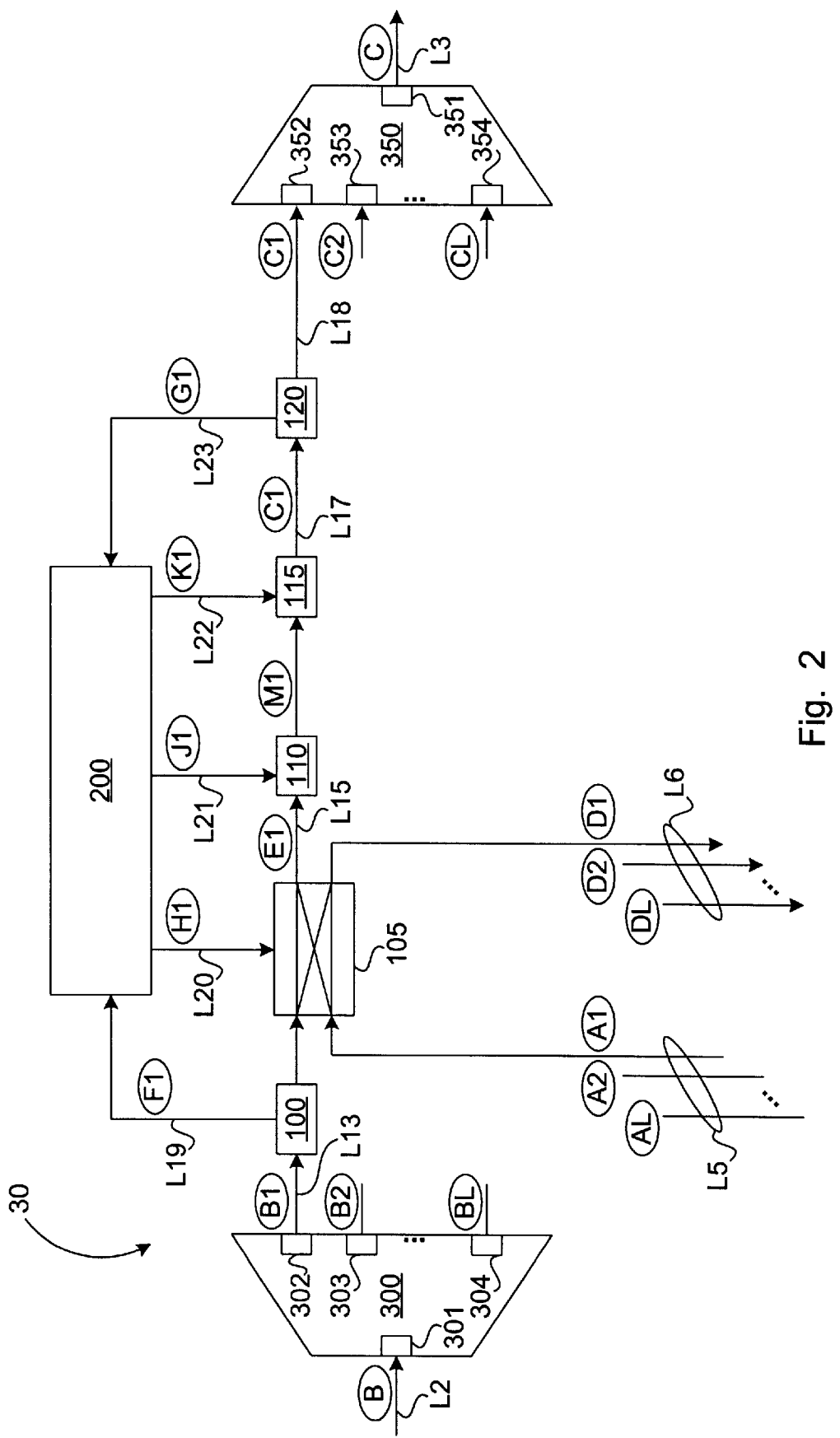
FIG. 2 is an internal block diagram of an ADM of FIG. 1, in accordance with the preferred embodiment of the present invention.

Additional reference is now made to FIG. 2, which shows in more detail the unidirectional ADM 30 in accordance with the present invention. In particular, the optical segment L2 carrying WDM signal B is connected to an input port 301 of an optical demultiplexer 300. The demultiplexer 300 also comprises a plurality (L) of output ports 302,303, . . . ,304, from which extend respective demultiplexed optical signal lines L13 (and others not shown) carrying respective demultiplexed optical signals B1,B2, . . . ,BL. In theory, L may be as large as desired, although powers of two ranging from 2 to 32 are most useful.

Signal line L13 is intercepted by an optoelectronic converter 100 before reaching one input of a two-input, two-output (2×2) optical switch 105. The converter 100 is connected to a controller 200 by an electronic signal line L19 carrying a feedforward signal F1. The second input of the switch 105 is one of the optical add lines L5, carrying optical add signal A1. The switch 105 has two optical output signal lines, namely, a signal line L15 transporting a signal E1, and one of the drop lines L6, carrying drop signal D1. The switch 105 is controlled by an electronic control signal H1 on signal line L20 from the controller 200. The controller 200 is preferably a digital signal processor running a software algorithm, although an analog circuit can be employed to achieve the functions described hereunder.

Signal line L15 at the output of switch 105 is intercepted by a modulator 110 producing a signal M1 that enters an attenuator 115, from which extends an optical signal line L17 carrying a signal C1. The modulator 110 and attenuator 115 are controlled by respective electronic control signals J1,K1 on respective signal lines L21,L22 leading from the controller 200. Signal line L17 at the output of the attenuator 115 is intercepted by another optoelectronic converter 120. The converter 120 is linked to the controller 200 by an electronic signal line L23 carrying a feedback signal G1, and outputs an optical signal line L18, still carrying signal C1, to an optical input 352 of an optical multiplexer 350.

The multiplexer 350 has multiple optical input ports 352,353, . . . ,354 transporting respective signals C1,C2, . . . ,CL, and one optical output port 351, which carries WDM signal C on signal line L3. An optical signal path leading from each of the demultiplexer output ports 303, . . . ,304 to an associated multiplexer input port 353, . . . ,354 exists, and is identical to the one described above leading from demultiplexer output port 302 to multiplexer input port 352. Although not explicitly illustrated in FIG. 2, it is to be understood that each such path involves a corresponding add line, drop line, switch, modulator, attenuator, and pair of optoelectronic converters. On the other hand, all these components are electronically connected to the single, centralized controller 200.

In operation, signal B is typically a WDM optical signal carrying L individual high-speed optical signals B1,B2, . . . ,BL. These individual signals are separated by the optical demultiplexer 300, and preferably consist of frames of digital data arranged according to a synchronous transmission standard such as SONET (synchronous optical network) or SDH (synchronous digital hierarchy). Ideally, at least one of the individual optical signals B1,B2, . . . ,BL, called the control channel, will be dedicated to providing control instructions to the controller, and may operate at a lower data rate.

Considering signal D1, it is tapped by the optoelectronic converter 100, meaning that a small percentage of the optical power of signal B1 is converted into analog electronic format by, for example, a PIN diode. The analog electronic signal is sampled and converted to a digital electronic signal by an analog-to-digital converter. This digital electronic representation of optical signal B1 is in fact the feedforward signal F1 that is input to the controller 200 along signal line L19.

The switch 105 executes one of two possible mappings. The "straight-through" mapping means routes the incoming signal from the input port to the output port, i.e., signal B1 to signal E1. The "cross-over" mapping means routes the incoming signal from the input port to the drop port, and the add signal from the add port to the output port, i.e., E1 to D1 and A1 to E1. Selection of the input-output mapping to be executed is achieved through electronic control signal H1 from the controller 200.

The modulator 110 subsequently changes signal E1 into signal M1 by adding or removing a low-frequency, low-amplitude control signal, as will be described hereunder. Control of the modulator is achieved via electronic control signal J1.

The attenuator 115 is instructed to apply a controllable amount of attenuation to signal M1 via electronic control signal K1 from the controller 200, thereby yielding optical signal C1 that passes through the converter 120 on its way to the multiplexer 350. The converter 120 taps a small amount of optical energy from signal C1, producing a digital electronic version G1 that is fed back to the controller 200 along signal line L23. The multiplexer 350 recombines-the individual optical signals C1,C2, . . . ,CL in a known way to give WDM signal C on optical signal line L3.

In the absence of, or in combination with, a dedicated control channel, the feedforward and feedback electronic signals from the optoelectronic converters 100,120 (and those in the other signal paths) are vital to controlling operation of the controller 200. When switching, modulation or attenuation decisions are to be made that require information about an incoming signal, for example, then the feedforward control signals are interpreted by the controller. On the other hand, the feedback control signals are useful for verification purposes (e.g., after switching) or for extracting information from the add lines once they have been switched.

In the case of feedforward signal F1 and feedback signal G1, they are electronic representations of high-speed (possibly several dozen Gbps) optical signals E1 and C1, respectively. However, there is an upper limit to the data rate (on the order of 1 Mbps) that can be successfully converted by standard optoelectronic converters. Hence, special techniques are required to embed channel-dependent control information in each of the signals B1,B2, . . . ,BL, C1,C2, . . . ,CL.

A suitable method is disclosed in U.S. Pat. No. 5,513,029 (Roberts et al.), wherein a high-frequency optical signal is modulated with a low-frequency, low-amplitude control, or "dither", signal at a known modulation depth. The low frequency of the dither (e.g., 64 kbps) permits accurate conversion into digital electronic format by a standard optoelectronic converter, and the low amplitude of the dither (approximately 1% of the signal amplitude) prevents corruption of the high-frequency data signal on which the dither is superimposed. U.S. Pat. No. 5,513,029 (Roberts et al.) is hereby incorporated by reference herein.

Figure 3:
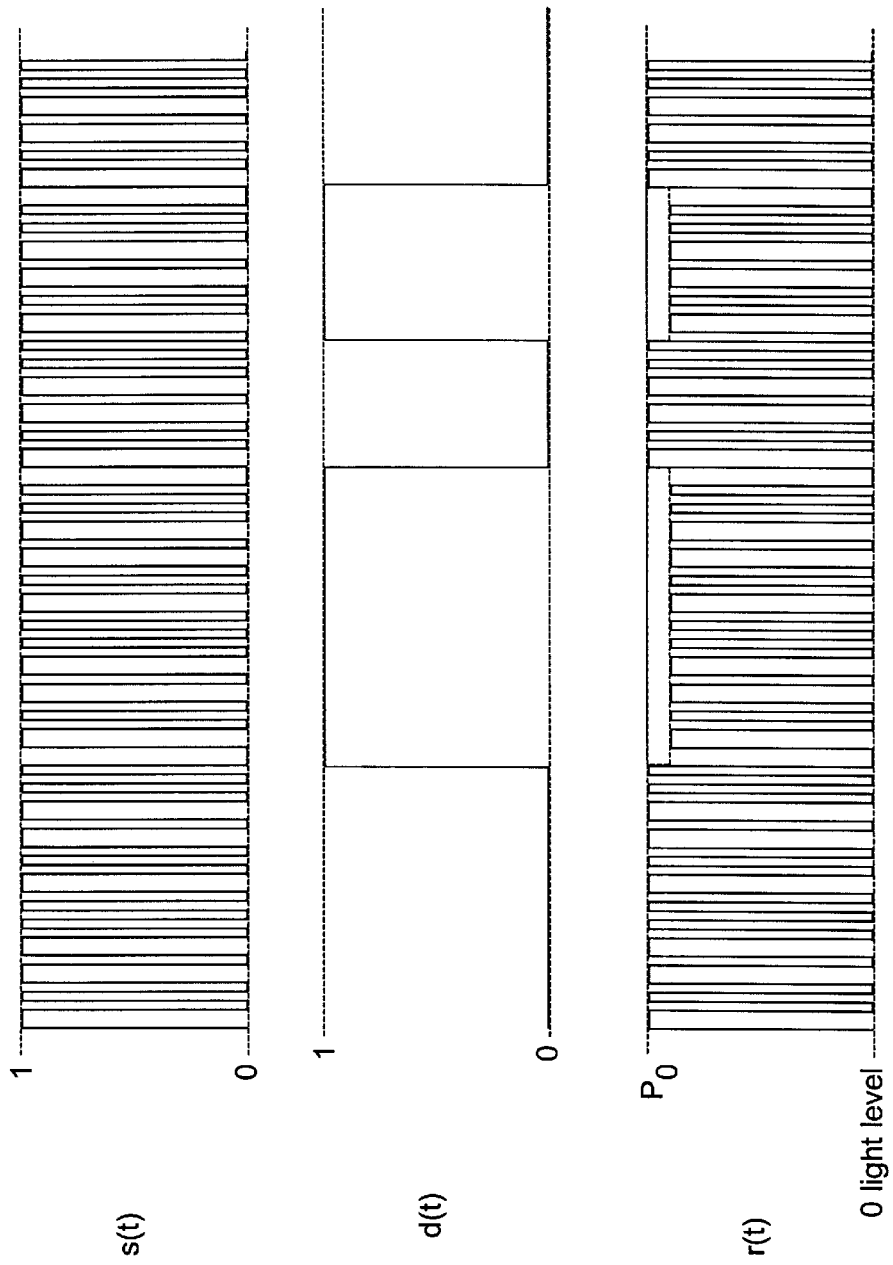
FIG. 3 shows signal levels of a dithered optical signal.

Reference is made to FIG. 3, in which is shown an arbitrary high-frequency optical signal s(t), consisting of pulses of light. The dither signal is shown as being a digital signal d(t), which is scaled by a modulation depth constant "M" and subtracted from the initial signal s(t) to give the resultant, "dithered" signal r(t). The peak optical power Po is a parameter that is dependent on the type of optical signalling used in the system.

It is known to apply such a modulation technique to a high-speed optical signal in order to assist in downstream estimation of the optical power of the received signal relative to the power of the noise. For instance, an optical signal may have been been dithered at a known modulation depth "M" by a transmitter upstream from the ADM. If the corresponding received signal at the ADM is B1, then a low pass filter can be applied to the digital signal F1 in order to extract the embedded dither. This yields a pure low-frequency dither signal of a certain detected amplitude δ. The received signal amplitude is therefore estimated to be δ/M and is compared with the peak known amplitude Po used in the system. An accurate estimate of signal power can thus be obtained irrespective of noise on the received signal, since the dither signal is not random and can be extracted by correlating F1 with known sequences.

A low value of signal power on a given channel may indicate a significant loss along the channel. A conventional method of regulating the power of such an affected channel is to feed signal F1 along a "back channel" to the point of transmission, upstream from the ADM, and then to adjust the power of signal B1. In contrast, this invention provides power control functionality directly at the ADM 30 using the controller 200. Specifically, the attenuators (115 and those not shown in each of the other signal paths) can be controlled based on the estimated power of all the individual optical channels, thereby to equalize the optical power spectrum of WDM signal C according to a desired shape. In addition, the attenuator 115 can be used to controllably attenuate the power of optical signal C1 so as to reduce the impact of abrupt power variations of the output signal level on the receivers 80 and MOR 24 during an add/drop operation, i.e., when the switch operates in the cross-over mapping.

With specific regard to switching, the present invention provides programmable adding and dropping of channels. In particular, the controller 200 can detect routing instructions embedded in a dither signal superimposed on signal B1, and executes a program stored in its memory which controls the operation of switch 105. The switch 105 can also be controlled according to routing instructions contained in a dither signal superimposed on signal A1. In this case, the switch 105 may have to temporarily execute a cross-over mapping so as to allow the controller 200 to access the dither signal present on add signal A1.

Alternatively, operation of the switch 105 can be autonomously controlled according to the strength of signal B1 estimated using the above-identified method. If the estimated signal power of B1 is lower than a given threshold, the channel may have to be routed (dropped) to another part of the network. In the prior art, switching of signals based on power measurements could not be effected at the ADM in real time.

Considering now the modulator 110, it can be instructed by the controller 200 to add dither to (or remove dither from) signal E1 in order to satisfy downstream transmission equipment requirements. For example, if the equipment installed downstream from the ADM relies on a dither signal for executing switching or other control functions, then the ADM can be instructed via the dedicated control channel to add an appropriate dither signal to E1. The advantage realized is that the transmission equipment upstream from the ADM need not be upgraded to accommodate downstream equipment, thereby ensuring interoperability between different equipment manufacturers.

On the other hand, if downstream equipment is excessively sensitive to information contained in the dither signal, dither removal may be necessary and can be achieved in two convenient ways. The dither signal superimposed on an individual optical input signal may contain a code instructing the controller 200 to instruct the appropriate modulator to add a phase-inverted "cancellation" dither onto the output signal. Alternatively, such instructions for the controller may be transmitted to the ADM via the dedicated control channel.

The dedicated control channel can also be used to override portions of the controller software algorithm, thereby permitting a remote network administrator to "log in" to the ADM and reprogram the controller. In the reverse direction, status and maintenance information can be transmitted from the ADM, e.g., to indicate a switch failure. For example, the dither signal extracted from feedback signal G1 can be matched against a list of acceptable sequences for routed channels, identifying whether the switch has performed the correct routing, and sending an appropriate message to an external network element. The data rate of the control channel in either direction is preferably on the order of 1 Mbps. Although it has been assumed that the control channel is an optical signal multiplexed into the WDM transmit and receive signals, an equally functional embodiment would employ a separate and direct electronic link between the controller 200 and an external network element.

Figure 4:
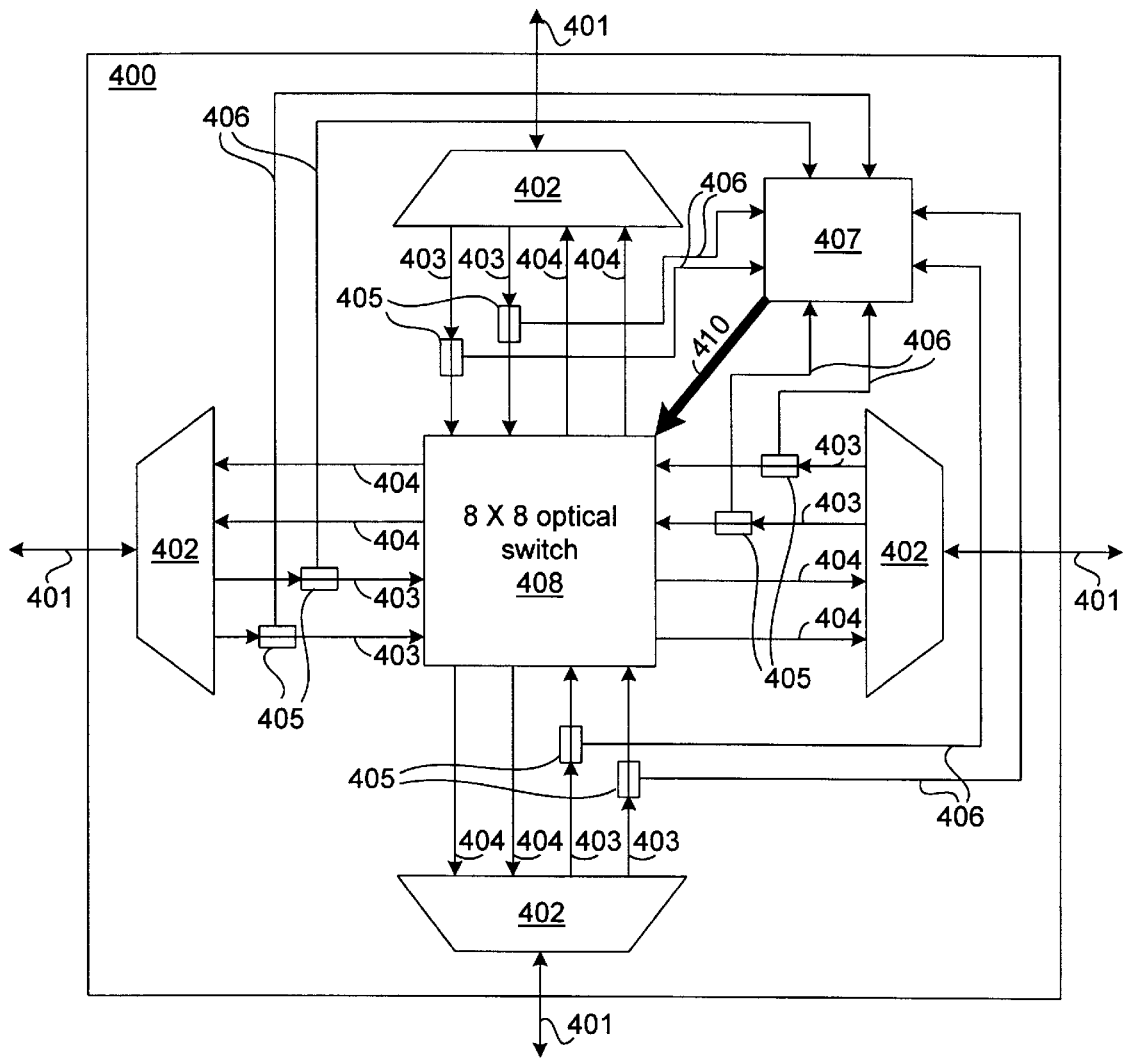
FIG. 4 is an internal block diagram of an ADM in accordance with an alternate embodiment of the present invention.

While the preferred embodiment of the invention has been described and illustrated it will be apparent to one skilled in the art that variations in the design may be made. For example, the network topology and the internal structure of the ADM may be radically different from those illustrated in FIGS. 1 and 2. FIG. 4 shows an alternate embodiment of an inventive ADM 400 configured as a WDM router in a star network. It interfaces with bidirectional fibers 401 via respective bidirectional optical multiplexers 402. In the illustrated embodiment, the four fibers 401 may constitute a main signal path and a protected (redundant) signal path through the ADM. Optionally, each of the individual fibers 401 may carry independent traffic to and from distinct parts of the network.

Each bidirectional fiber 401 carries two respective downstream signals 403 and two respective upstream signals 404. The downstream signals 403 are intercepted by respective optoelectronic converters 405, which provide electronic signals 406 to a centralized controller 407 of the ADM. The downstream signals 403 enter an 8×8 optical switch 408, from which emerge the upstream signals 404. The switch 408 is controlled by the controller 407 via a control line 410.

In operation, the switch 408 routes its eight inputs to its eight outputs in a combination that is specified by the controller 407. The routing information is encoded into dither signals embedded in the downstream signals 403, and decoded by the controller 407. Not shown in FIG. 4 are modulators, attenuators and additional optoelectronic converters that may intercept the downstream signals 404.

Finally, both the controller (200 or 407) and the dither signal could be analog instead of digital. For example, the controller may comprise multiple bandpass filters that route incoming optical channels depending on the combination of frequencies present in their corresponding dither signals, akin to the multiple-frequency tones used in encoding and decoding dialled telephone digits.

It is to be understood that still other variations of the invention can be practised within the scope of the appended claims.

We claim:

1. A method of controlling a plurality of incoming optical data signals arriving at an optical add/drop multiplexer/demultiplexer connected in a fiber optic network, the method comprising the steps of:

detecting dither signals respectively embedded in the optical data signals;

extracting control information from the detected dither signals; and controlling the optical data signals on the basis of the control information.

2. A method as claimed in claim 1, wherein the step of detecting comprises:

converting a fraction of the optical intensity of each optical data signal into a respective low-frequency analog electronic signal.

3. A method as claimed in claim 2, wherein the step of detecting further comprises:

converting each analog electronic signal into a respective digital electronic signal.

4. A method as claimed in claim 1, wherein the step of controlling comprises:

if the dither signal embedded in an optical data signal is undetectable, dropping the respective optical data signal from a main signal path.

5. A method as claimed in claim 4, wherein the step of controlling further comprises:

prior to dropping the optical data signal, gradually decreasing its power level.

6. A method as claimed in claim 1, wherein the control information associated with a dither signal embedded in an optical data signal includes a switching instruction for switching the respective optical data signal, said switching instruction being an add instruction or a drop instruction and wherein the step of extracting control information comprises decoding switching instructions from the dither signals.

7. A method as claimed in claim 6, wherein the step of controlling comprises:

if the switching instruction associated with an optical data signal is a drop instruction, dropping the respective optical data signal from a main signal path.

8. A method as claimed in claim 7, wherein the step of controlling further comprises:

prior to dropping the optical data signal, gradually decreasing its power level.

9. A method as claimed in claim 6, wherein the step of controlling comprises:

if the switching instruction associated with an optical data signal is an add instruction, adding the respective optical signal to the main signal path.

10. A method as claimed in claim 9, wherein the step of controlling further comprises:

prior to adding the optical data signal, gradually decreasing its power level; and after adding the optical data signal, gradually increasing its power level.

11. A method as claimed in claim 1, wherein the step of extracting control information comprises measuring the amplitude of the dither signals.

12. A method as claimed in claim 11, wherein the step of controlling comprises attenuating the power level of an optical data signal as a function of both the measured amplitude of the respective dither signal and a known value.

13. A method as claimed in claim 1, wherein the control information associated with a dither signal embedded in an optical data signal includes modulation instructions for modulating the respective optical data signal and wherein the step of extracting control information comprises decoding modulation instructions from respective dither signals.

14. A method as claimed in claim 13, wherein the step of controlling comprises:

modulating an optical data signal in accordance with the respective decoded modulation instructions.

15. A computer readable medium having software stored thereon for instructing a computer to implement the method of claim 1.

16. An add/drop multiplexer/demultiplexer (ADM) adapted to implement the method of claim 1.

* * * * *